US012579975B2

(12) United States Patent
Huang et al.

(10) Patent No.: US 12,579,975 B2
(45) Date of Patent: Mar. 17, 2026

(54) DETECTING UNINTENDED MEMORIZATION IN LANGUAGE-MODEL-FUSED ASR SYSTEMS

(71) Applicant: Google LLC, Mountain View, CA (US)

(72) Inventors: Ronny Huang, Mountain View, CA (US); Steve Chien, Mountain View, CA (US); Om Thakkar, Fremont, CA (US); Rajiv Mathews, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 338 days.

(21) Appl. No.: 18/303,296

(22) Filed: Apr. 19, 2023

(65) Prior Publication Data

US 2023/0335126 A1 Oct. 19, 2023

Related U.S. Application Data

(60) Provisional application No. 63/363,240, filed on Apr. 19, 2022.

(51) Int. Cl.
*G10L 15/197* (2013.01)
*G10L 13/02* (2013.01)
*G10L 15/01* (2013.01)
*G10L 15/06* (2013.01)
*G10L 15/16* (2006.01)

(52) U.S. Cl.
CPC ............ *G10L 15/197* (2013.01); *G10L 13/02* (2013.01); *G10L 15/01* (2013.01); *G10L 15/063* (2013.01); *G10L 15/16* (2013.01)

(58) Field of Classification Search
None
See application file for complete search history.

(56) References Cited

U.S. PATENT DOCUMENTS 11,302,331 B2* 4/2022 Gowda .................. G06N 3/045

OTHER PUBLICATIONS

Iwama et al. "Automated Testing of Basic Recognition Capability for Speech Recognition Systems." IEEE, Jun. 6, 2019, https://ieeexplore.ieee.org/document/8730189. Accessed May 19, 19, 2025. (Year: 2019).*

(Continued)

*Primary Examiner* — Hai Phan
*Assistant Examiner* — Jon Christopher Meis
(74) *Attorney, Agent, or Firm* — Honigman LLP; Brett A. Krueger; Grant Griffith

(57) ABSTRACT

A method includes inserting a set of canary text samples into a corpus of training text samples and training an external language model on the corpus of training text samples and the set of canary text samples inserted into the corpus of training text samples. For each canary text sample, the method also includes generating a corresponding synthetic speech utterance and generating an initial transcription for the corresponding synthetic speech utterance. The method also includes rescoring the initial transcription generated for each corresponding synthetic speech utterance using the external language model. The method also includes determining a word error rate (WER) of the external language model based on the rescored initial transcriptions and the canary text samples and detecting memorization of the canary text samples by the external language model based on the WER of the external language model.

24 Claims, 6 Drawing Sheets

(56) References Cited

OTHER PUBLICATIONS

Parikh et al. "Canary Extraction in Natural Language Understanding Models." arXiv, Mar. 25, 2022, https://arxiv.org/pdf/2203.13920. Accessed May 19, 2025. (Year: 2022).*

Song et al. "Auditing Data Provenance in Text-Generation Models." arXiv, May 17, 2019, https://arxiv.org/pdf/1811.00513. Accessed 19 May 19, 2025. (Year: 2019).*

Chen et al. "Understanding Gradient Clipping in Private SGD: A Geometric Perspective." arXiv, Mar. 19, 2021, https://arxiv.org/pdf/2006.15429. Accessed May 19, 2025. (Year: 2021).*

Srinivasan et al. "Looking Enhances Listening: Recovering Missing Speech Using Images." IEEE, Apr. 9, 2020, https://ieeexplore.ieee.org/document/9053397. Accessed May 19, 2025. (Year: 2020).*

Brownlee "Random Oversampling and Undersampling for Imbalanced Classification." Machine Learning Mastery, Jan. 5, 2021, https://machinelearningmastery.com/random-oversampling-and-undersampling-for-imbalanced-classification/. Accessed May 19, 2025 via archive.org (Year: 2021).*

Lee et al. "Adaptable Multi-Domain Language Model for Transformer ASR." IEEE, May 13, 2021, https://ieeexplore.ieee.org/abstract/document/9413475. Accessed May 19, 2025. (Year: 2021).*

Moritz et al. "Dual Causal/Non-Causal Self-Attention for Streaming End-to-End Speech Recognition." arXiv, Jul. 2, 2021, https://arxiv.org/pdf/2107.01269. Accessed May 20, 2025. (Year: 2021).*

Variani et al. "Hybrid Autoregressive Transducer (HAT)." arXiv, Mar. 12, 2020, https://arxiv.org/pdf/2003.07705. Accessed May 20, 2025. (Year: 2020).*

Narayanan et al. "Cascaded Encoders for Unifying Streaming and Non-Streaming ASR." arXiv, Oct. 27, 2020, https://arxiv.org/pdf/2010.14606. Accessed Sep. 10, 2025. (Year: 2020).*

Nicholas Carlini et al: "The Secret Sharer: Evaluating and Testing Unintended Memorization in Neural Networks", arxiv.org, Cornell University Library, 201 Olin Library Cornell University Ithaca, NY 14853, Feb. 22, 2018 (Feb. 22, 2018), XP081435238.

Martin Abadi et al: "Deep Learning with Differential Privacy", arxiv.org, Cornell University Library, 201 Olin Library Cornell University Ithaca, NY 14853, Jul. 1, 2016 (Jul. 1, 2016) XP081396507.

Ronny Huang W et al: "Detecting Unintended Memorization in Language-Model-Fused ASR", arxiv.org, Cornell University Library, 201 Olin Library Cornell University Ithaca, NY 14853, Apr. 20, 2022 (Apr. 20, 2022), XP091207001.

International Search Report and Written Opinion issued in related PCT Application No. PCT/US2023/019135, dated Apr. 19, 2024.

* cited by examiner

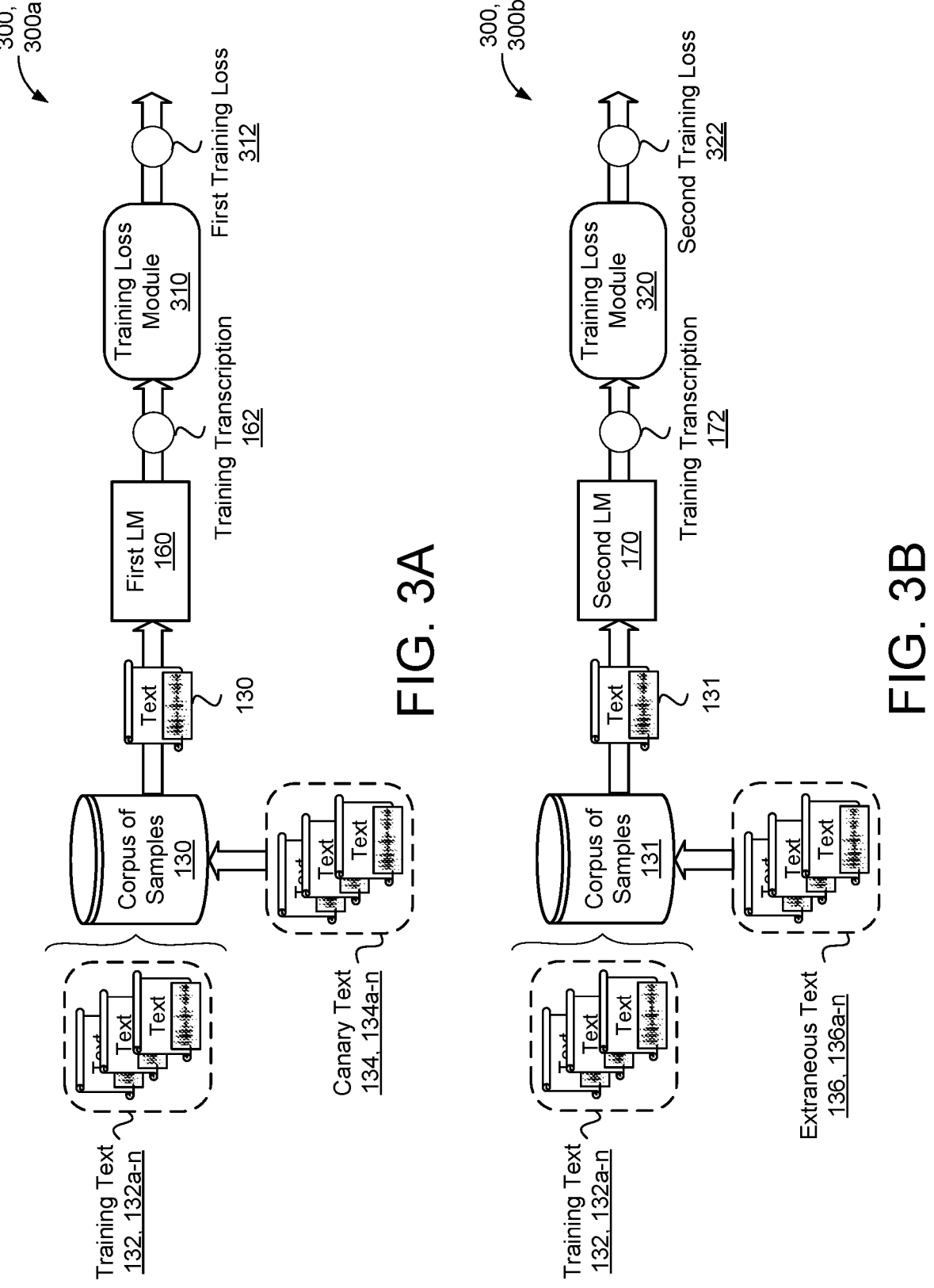

DETECTING UNINTENDED MEMORIZATION IN LANGUAGE-MODEL-FUSED ASR SYSTEMS

CROSS REFERENCE TO RELATED APPLICATIONS

This U.S. Patent Application claims priority under 35 U.S.C. § 119(e) to U.S. Provisional Application 63/363, 240, filed on Apr. 19, 2022. The disclosure of this prior application is considered part of the disclosure of this application and is hereby incorporated by reference in its entirety.

TECHNICAL FIELD

This disclosure relates to detecting unintended memorization in language-model-fused ASR systems.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. In some instances, modern ASR models leverage a language models (LM) to disambiguate acoustically similar transcriptions hypotheses generated by the ASR model. However, one drawback of using the LM includes unintentionally memorizing potentially sensitive text data during training of the LM. As a result, memorizing the sensitive text data creates a privacy vulnerability for the LM whereby hackers may gain access to the sensitive text data used to train the LM.

SUMMARY

One aspect of the disclosure provides a computer-implemented method that when executed on data processing hardware causes the data processing hardware to perform operations for detecting unintended memorization in language model automatic speech recognition (ASR) systems. The operations include inserting a set of canary text samples into a corpus of training text samples and training an external language model on the corpus of training text samples and the set of canary text samples inserted into the corpus of training text samples. For each canary text sample in the set of canary text samples, the operations include generating a corresponding synthetic speech utterance using a text-to-speech (TTS) system and generating an initial transcription for the corresponding synthetic speech utterance using a trained ASR model configured to receive the corresponding synthetic speech utterance as input. The operations also include rescoring the initial transcription generated for each corresponding synthetic speech utterance using the external language model trained on the corpus of training text samples and the set of canary text samples inserted into the corpus of training text samples. The operations also include determining a word error rate (WER) of the external language model based on the rescored initial transcriptions and the canary text samples and detecting memorization of the canary text samples by the external language model based on the WER of the external language model.

Implementations of the disclosure may include one or more of the following optional features. In some implementations, a lower WER of the external language model corresponds to an increased memorization of the canary text samples by the external language model. In some examples, the operations further include: inserting a set of extraneous text samples into a second corpus of training text samples; training a second external language model on the second corpus of training text samples and the set of extraneous text samples inserted into the second corpus of training text samples; for each canary text sample in the set of canary text samples, receiving the initial transcription generated by the trained ASR model for the corresponding synthetic speech utterance; rescoring the initial transcription generated for each corresponding synthetic speech utterance using the second language model trained on the second corpus of training text samples and the set of extraneous text samples inserted into the second corpus of training text samples; determining a second WER of the second external language model based on the initial test transcription rescored by the second external language model and the canary text samples; and detecting memorization of the canary text samples by the external language model by comparing the WER of the external language model and the second WER of the second external language model.

The operations may further include mitigating the detected memorization of the canary text samples by the external language model by applying per-sample gradient clipping by clipping a gradient from a prescribed number of the canary text samples when training the external language model. In some implementations, the operations further include, for each canary text sample in the set of canary text samples, adding noise to a suffix portion of the corresponding synthetic speech utterance without adding any noise to a prefix portion of the corresponding synthetic speech utterance and determining, using a classifier, that the corresponding canary text sample was used to train the external language model based on the rescored initial transcription generated for the corresponding synthetic speech utterance matching the corresponding canary text sample. Each canary text sample in the set of canary text samples may include a fixed-length sequence of random alphanumeric characters each separated by a space.

In some examples, inserting the set of canary text samples into the corpus of training text samples includes inserting each canary text sample of a first portion of canary text samples in the set of canary text samples a single time into the corpus of training text samples and inserting each canary text sample of a second portion of canary text samples in the set of canary text samples two or more times into the corpus of training text samples. In these examples, the second portion of canary text samples include different canary text samples than the first portion of canary text samples. The external language model may include an external neural language model. Here, the external neural language model may include a stack of transformer layers or Conformer layers. In some implementations, the operations further include integrating the trained external language model with the trained ASR model where the trained external language model is configured to rescore probability distributions over possible speech recognition hypotheses predicted by the trained ASR model.

In some examples, the trained ASR model includes: a first encoder configured to receive a sequence of acoustic frames as input and generate, at each of a plurality of output steps, a first higher order feature representation for a corresponding acoustic frame in the sequence of acoustic frames; a second encoder configured to receive, as input, the first higher order feature representation generated by the first encoder at each of the plurality of output steps and generate, at each of the plurality of output steps, a second higher order feature representation for a corresponding first higher order feature frame; and a decoder configured to receive, as input, the second higher order feature representation generated by the second encoder at each of the plurality of output steps and generate, at each of the plurality of time steps, a first probability distribution over possible speech recognition hypotheses. Here, the decoder or another decoder may be further configured to receive, as input, the first higher order feature representation generated by the first encoder at each of the plurality of output steps and generate, at each of the plurality of output steps, a second probability distribution over possible speech recognition hypotheses.

In some implementations, the decoder includes: a predication network configured to, at each of a plurality of output steps, receive a sequence of N previous non-blank symbols output by a final Softmax layer as input, generate a respective embedding for each non-blank symbol of the sequence of N previous non-blank symbols, and generate an average embedding by averaging the respective embeddings; and a joint network configured to receive, as input, the average embedding generated by the prediction network at each of the plurality of output steps and one of the first higher order feature representation generated by the first encoder at each of the plurality of output steps when the ASR model is operating in a streaming mode or the second higher order feature representation generated by the second encoder at each of the plurality of output steps when the ASR model is operating in a non-streaming mode. In these implementations, the decoder is further configured to generate, at each of a plurality of output steps, one of the second probability distribution over possible speech recognition hypotheses when the ASR model is operating in the streaming mode or the first probability distribution over possible speech recognition hypotheses when the ASR model is operating in the non-streaming mode. The first encoder may include a causal encoder that has an initial stack of Conformer layers and the second encoder includes a non-causal encoder that has a final stack of Conformer layers overlain on the initial stack of Conformer layers. In some examples, the first encoder and the second encoder of the ASR model are trained using Hybrid Autoregressive Transducer Factorization to facilitate the integration of the external language model trained on text-only data that includes the corpus of training text samples and the set of canary text samples inserted into the corpus of training text samples.

Another aspect of the disclosure provides a system that includes data processing hardware and memory hardware storing instructions that when executed on the data processing hardware causes the data processing hardware to perform operations. The operations include inserting a set of canary text samples into a corpus of training text samples and training an external language model on the corpus of training text samples and the set of canary text samples inserted into the corpus of training text samples. For each canary text sample in the set of canary text samples, the operations include generating a corresponding synthetic speech utterance using a text-to-speech (TTS) system and generating an initial transcription for the corresponding synthetic speech utterance using a trained ASR model configured to receive the corresponding synthetic speech utterance as input. The operations also include rescoring the initial transcription generated for each corresponding synthetic speech utterance using the external language model trained on the corpus of training text samples and the set of canary text samples inserted into the corpus of training text samples. The operations also include determining a word error rate (WER) of the external language model based on the rescored initial transcriptions and the canary text samples and detecting memorization of the canary text samples by the external language model based on the WER of the external language model.

Implementations of the disclosure may include one or more of the following optional features. In some implementations, a lower WER of the external language model corresponds to an increased memorization of the canary text samples by the external language model. In some examples, the operations further include: inserting a set of extraneous text samples into a second corpus of training text samples; training a second external language model on the second corpus of training text samples and the set of extraneous text samples inserted into the second corpus of training text samples; for each canary text sample in the set of canary text samples, receiving the initial transcription generated by the trained ASR model for the corresponding synthetic speech utterance; rescoring the initial transcription generated for each corresponding synthetic speech utterance using the second language model trained on the second corpus of training text samples and the set of extraneous text samples inserted into the second corpus of training text samples; determining a second WER of the second external language model based on the initial test transcription rescored by the second external language model and the canary text samples; and detecting memorization of the canary text samples by the external language model by comparing the WER of the external language model and the second WER of the second external language model.

The operations may further include mitigating the detected memorization of the canary text samples by the external language model by applying per-sample gradient clipping by clipping a gradient from a prescribed number of the canary text samples when training the external language model. In some implementations, the operations further include, for each canary text sample in the set of canary text samples, adding noise to a suffix portion of the corresponding synthetic speech utterance without adding any noise to a prefix portion of the corresponding synthetic speech utterance and determining, using a classifier, that the corresponding canary text sample was used to train the external language model based on the rescored initial transcription generated for the corresponding synthetic speech utterance matching the corresponding canary text sample. Each canary text sample in the set of canary text samples may include a fixed-length sequence of random alphanumeric characters each separated by a space.

In some examples, inserting the set of canary text samples into the corpus of training text samples includes inserting each canary text sample of a first portion of canary text samples in the set of canary text samples a single time into the corpus of training text samples and inserting each canary text sample of a second portion of canary text samples in the set of canary text samples two or more times into the corpus of training text samples. In these examples, the second portion of canary text samples include different canary text samples than the first portion of canary text samples. The external language model may include an external neural language model. Here, the external neural language model may include a stack of transformer layers or Conformer layers. In some implementations, the operations further include integrating the trained external language model with the trained ASR model where the trained external language model is configured to rescore probability distributions over possible speech recognition hypotheses predicted by the trained ASR model.

In some examples, the trained ASR model includes: a first encoder configured to receive a sequence of acoustic frames as input and generate, at each of a plurality of output steps, a first higher order feature representation for a corresponding acoustic frame in the sequence of acoustic frames; a second encoder configured to receive, as input, the first higher order feature representation generated by the first encoder at each of the plurality of output steps and generate, at each of the plurality of output steps, a second higher order feature representation for a corresponding first higher order feature frame; and a decoder configured to receive, as input, the second higher order feature representation generated by the second encoder at each of the plurality of output steps and generate, at each of the plurality of time steps, a first probability distribution over possible speech recognition hypotheses. Here, the decoder or another decoder may be further configured to receive, as input, the first higher order feature representation generated by the first encoder at each of the plurality of output steps and generate, at each of the plurality of output steps, a second probability distribution over possible speech recognition hypotheses.

In some implementations, the decoder includes: a prediction network configured to, at each of a plurality of output steps, receive a sequence of N previous non-blank symbols output by a final Softmax layer as input, generate a respective embedding for each non-blank symbol of the sequence of N previous non-blank symbols, and generate an average embedding by averaging the respective embeddings; and a joint network configured to receive, as input, the average embedding generated by the prediction network at each of the plurality of output steps and one of the first higher order feature representation generated by the first encoder at each of the plurality of output steps when the ASR model is operating in a streaming mode or the second higher order feature representation generated by the second encoder at each of the plurality of output steps when the ASR model is operating in a non-streaming mode. In these implementations, the decoder is further configured to generate, at each of a plurality of output steps, one of the second probability distribution over possible speech recognition hypotheses when the ASR model is operating in the streaming mode or the first probability distribution over possible speech recognition hypotheses when the ASR model is operating in the non-streaming mode. The first encoder may include a causal encoder that has an initial stack of Conformer layers and the second encoder includes a non-causal encoder that has a final stack of Conformer layers overlain on the initial stack of Conformer layers. In some examples, the first encoder and the second encoder of the ASR model are trained using Hybrid Autoregressive Transducer Factorization to facilitate the integration of the external language model trained on text-only data that includes the corpus of training text samples and the set of canary text samples inserted into the corpus of training text samples.

The details of one or more implementations of the disclosure are set forth in the accompanying drawings and the description below. Other aspects, features, and advantages will be apparent from the description and drawings, and from the claims.

6

DESCRIPTION OF DRAWINGS

FIGS. 3A and 3B are schematic views of example training processes for training external language models.

Like reference symbols in the various drawings indicate like elements.

DETAILED DESCRIPTION

Figure 1:
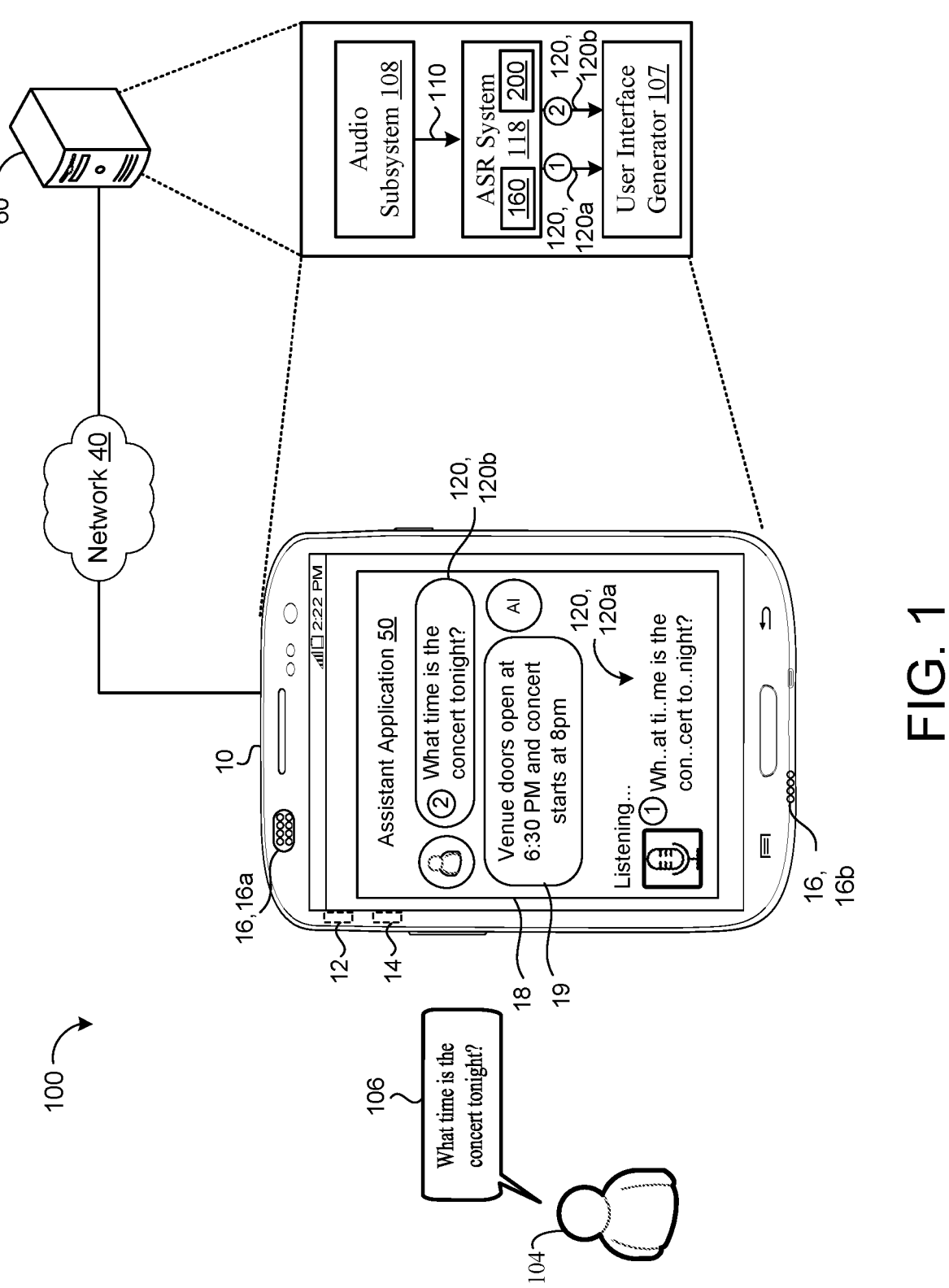
FIG. 1 is a schematic view of an example speech environment using a cascaded encoders and language model architecture for automatic speech recognition.

Conventionally, end-to-end (E2E) automatic speech recognition (ASR) models include an encoder and a decoder as the main components. For instance, the encoder generates encoded input audio data and the decoder generates candidate transcriptions corresponding to the input audio data. Many modern ASR models further leverage an external language model (LM) that is configured to use linguistic information to disambiguate acoustically similar candidate transcriptions generated by the ASR model. For example, the LM may determine that "directions to dog park" is much more likely to be an accurate transcription than "directions to dog bark" based on linguistic information that "directions to dog park" has a higher probability of being spoken by a user. In particular, by leveraging LMs, ASR models may significantly improve performance (e.g., word error rate (WER)) for recognizing rare or out of vocabulary (OOV) words spoken by a user.

LMs are trained on millions of training text samples including generic text samples and user-specific text samples such as contact lists, typing patterns, and other user-specific information. Thus, training the LM on user-specific text samples for a particular user results in the LM producing transcriptions tailored specifically for the user. For example, the LM may improve an incorrect transcription of "call Hailee" generated to by the ASR model to a correct transcription of "call Haleigh" based on the LM training on contact names associated with a user.

However, a major drawback of training the LM using user-specific text samples is that the LM may unintentionally memorize potentially sensitive information specific to the user. For example, training the LM using a user's credit card number allows the LM to produce an accurate transcription when the user speaks their credit card number, however, the LM may also unintentionally memorize the credit card number. As used herein, user-specific text samples used to train the LM that are unintentionally memorized by the LM are referred to as canary text samples. The canary text samples may include sensitive information associated with users. The memorization of canary text samples may be exploited by hackers that are able to determine these memorized canary text samples thereby exploiting the potentially sensitive information. However, several obstacle exist in determining whether a LM has unintentionally memorized canary text samples. Namely, ASR models are configured to receive, as input, audio data (rather than textual data) and generate, as output, a single transcript for each utterance. Thus, when direct access of the LM is unavailable to obtain a list of the N-best transcriptions, conventional attacks on the LM are unable to determine any memorized text data.

Accordingly, implementations herein are directed towards methods and systems for detecting canary text samples unintentionally memorized by an external LM. More specifically the method includes inserting a set of canary text samples into a corpus of training text samples and training the external LM on the corpus of training text samples and the set of canary text samples inserted into the corpus of training text samples. For each canary text sample, a text-to-speech (TTS) system generates a corresponding synthetic speech utterance and a trained ASR model generates an initial transcription for the corresponding synthetic speech utterance. The trained external LM rescores the initial transcription generated for each corresponding synthetic speech utterance. Using the rescored initial transcriptions and the canary text samples, the method determines a word error rate (WER) of the external LM and detects memorization of the canary text samples by the external LM. As will become apparent, detecting the memorization of the canary text samples may include using another external LM not trained on the canary text samples and/or using a classifier. Detecting memorized canary text samples merely identifies a potential security vulnerability of the LM. To that end, the methods and systems may further be directed towards applying per-sample gradient clipping by clipping a gradient from a specified number of canary text samples to mitigate the external LM from memorizing the canary text samples during training.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the device 10. Speech enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating with an audible audio signal (e.g., as output data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implements an ASR model (e.g., trained ASR model) 200 and a first external language model (LM) 160 each residing on the user device 10 of the user 104 and/or on a remote computing device 60 (e.g., one or more remote servers of a distributed system executing in a cloud-computing environment) in communication with the user device 10 via a network 40. In some examples, the ASR model 200 includes a recurrent neural network-transducer (RNN-T) model architecture. The user device 10 and/or the remote computing device 60 also includes an audio subsystem 108 configured to receive the utterances 106 spoken by the user 104 and captured by the audio capture device 16a, and convert the utterance 106 into a corresponding digital format associated with the input acoustic frames 110 capable of being processed by the ASR system 118. In the example, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result (e.g., candidate hypothesis) 120, 120a and generate a final speech recognition result (e.g., final hypothesis) 120, 120b by improving the initial speech recognition result 120a. The initial and final speech recognition result 120a, 120b may either correspond to a partial speech recognition result or an entire speech recognition result. Stated differently, the initial and final speech recognition result 120a, 120b may either correspond to a portion of an utterance 106 or an entire portion of an utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a. Described in greater detail with reference to FIG. 2, the first external LM 160 may rescore the transcription 120 generated by the ASR model 200 to improve upon the transcription 120 in either a streaming mode or a non-streaming mode. The first external LM 160 may reside external from the ASR model 200 or be integrated with the ASR model 200.

The user device 10 and/or the remote computing device 60 also execute a user interface generator 107 configured to present a representation of the transcription 120 of the utterance 106 to the user 104 of the user device 10. As described in greater detail below, the user interface generator 107 may display the initial speech recognition result 120a in a streaming fashion during time 1 and subsequently display the final speech recognition result 120b in a streaming fashion during time 2. Notably, the ASR model 200 outputs the final speech recognition 120b in a streaming fashion even though the final speech recognition result 120b improves upon the initial speech recognition result 120a. In some configurations, the transcription 120 output from the ASR system 118 is processed (e.g., by a natural language understanding (NLU) module executing on the user device 10 or the remote computing device 60) to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by the audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition result 120a. During time 1, the user interface generator 107 presents, via the digital assistant interface 18, a representation of the initial speech recognition result 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistance interface 18, a representation of the final speech recognition result 120b of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition result 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, as the final speech recognition result 120b is presumed to be more accurate than the initial speech recognition result 120a, the final speech recognition result 120b ultimately displayed as the transcription 120 may fix any terms that may have been misrecognized in the initial speech recognition result 120a. In this example, the streaming initial speech recognition results 120a output by the ASR model 200 are displayed on the screen of the user device 10 at time 1 and are associated with low latency and provide responsiveness to the user 104 that his/her query is being processed, while the final speech recognition result 120b output by the ASR model 200 and displayed on the screen at time 2 leverages an additional speech recognition model and/or a language model to improve the speech recognition quality in terms of accuracy, but at increased latency. However, since the initial speech recognition results 120a are displayed as the user speaks the utterance 106, the higher latency associated with producing, and ultimately displaying, the final speech recognition result 120b is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistance returns a response 19 to the user's query where the response 19 states, "Venue doors open at 6:30 PM and concert starts at 8 pm." In some configurations, natural language processing occurs on the remote server 60 in communication with the data processing hardware 12 of the user device 10.

Figure 2A:
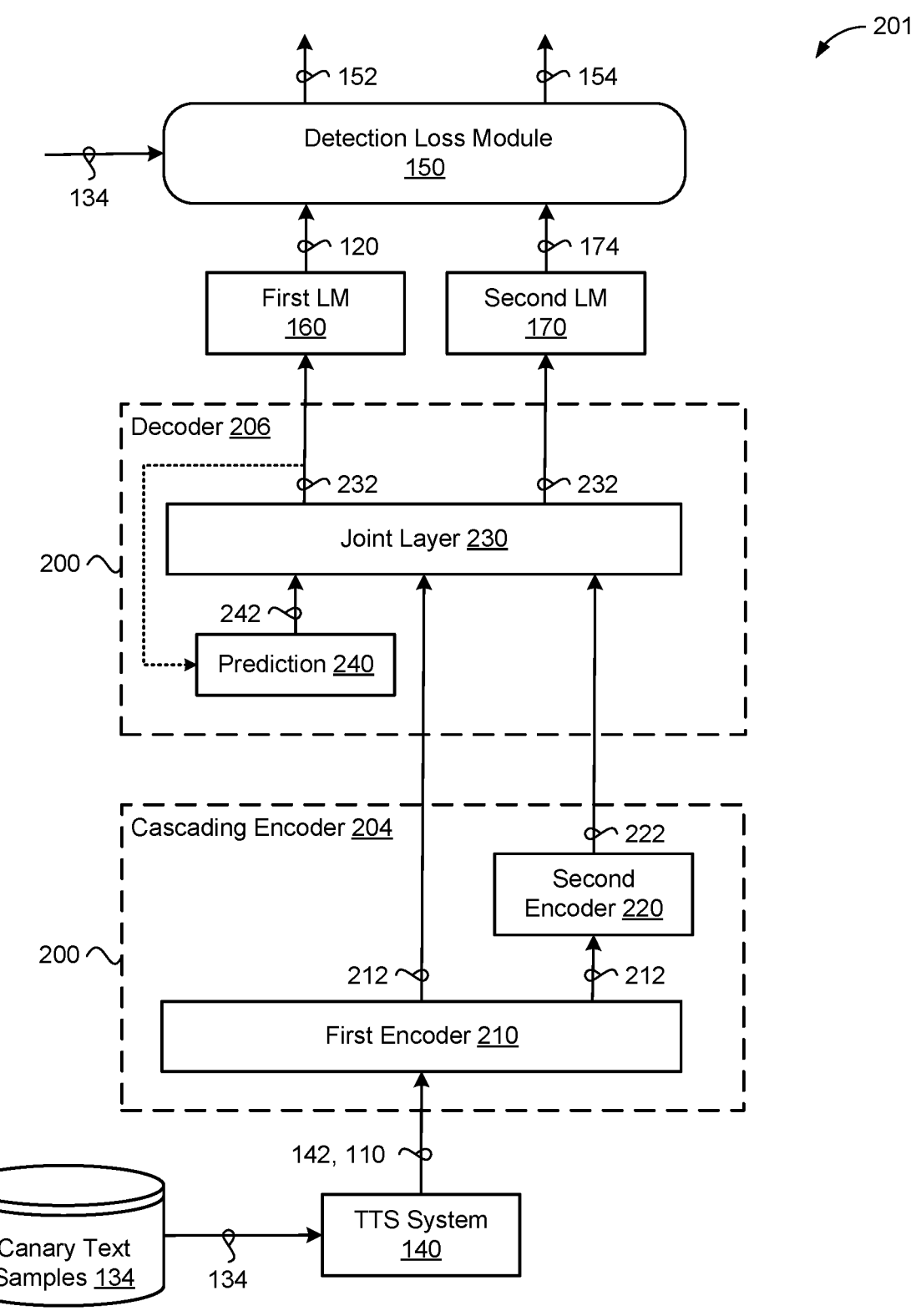
FIGS. 2A and 2B are schematic views of example processes for detecting unintended memorization of canary text samples.
Figure 2B:
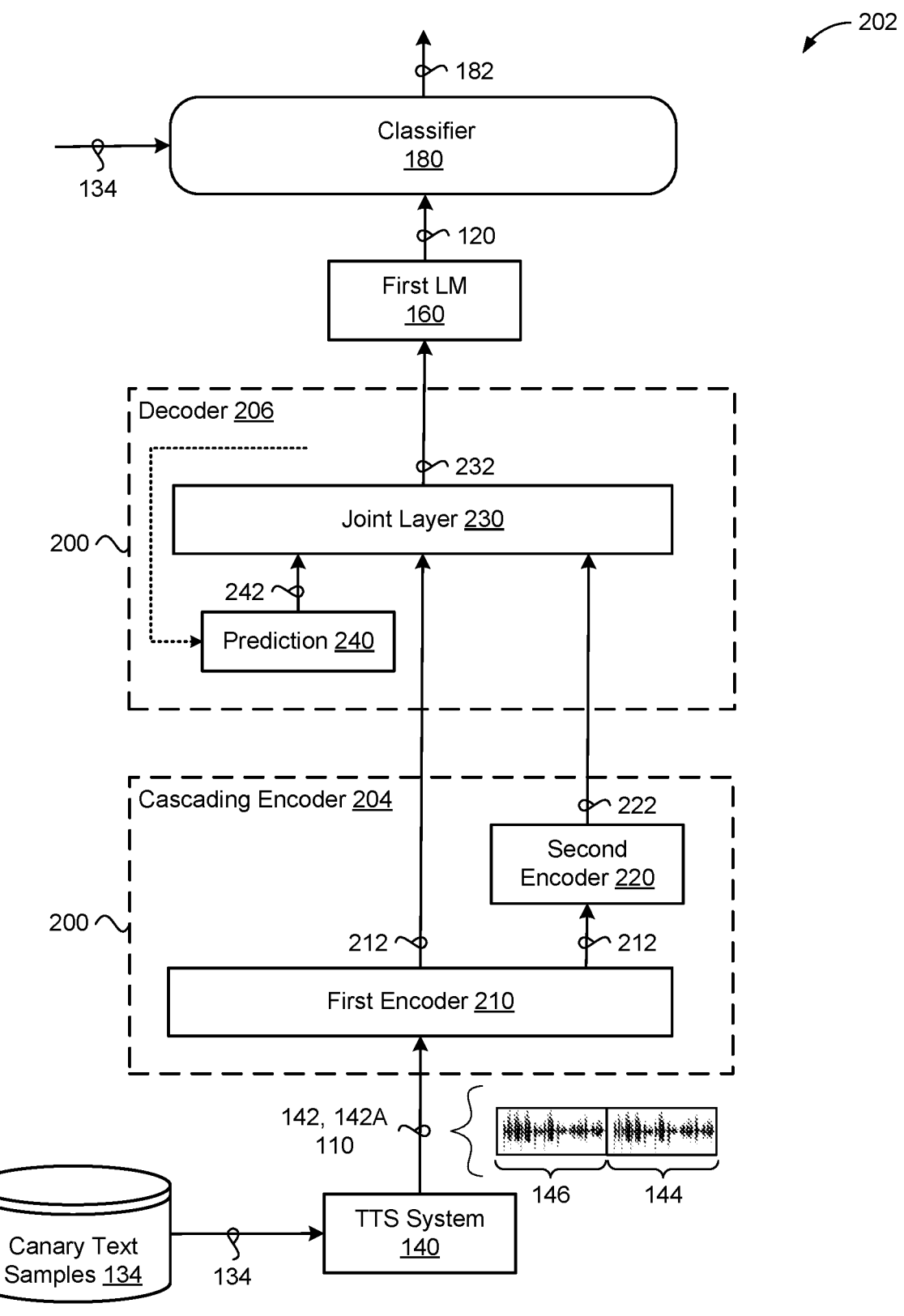

FIGS. 2A and 2B illustrate schematic views of a first example process 201 (FIG. 2A) and a second example process 202 (FIG. 2B) for detecting unintended memorization of canary text samples 134 by the first external LM 160. The processes 201, 202 execute at the remote server 60 (FIG. 1) and include the trained ASR model 200 that has a cascading encoder 204 and a decoder 206. As will become apparent, the ASR model 200 may operate in a streaming mode, a non-streaming mode, and/or both the streaming mode and non-streaming mode operating in parallel. Moreover, the processes 201, 202 may employ one or more components external from the ASR model 200 including, but not limited to, a text-to-speech (TTS) system 140 and the first external LM 160.

Referring now to FIGS. 3A and 3B, in some implementations, a training process 300 is configured to train the first external LM 160 and a second external LM 170. As will become apparent, the second external LM 170 may be used a baseline LM for detecting whether the first external LM 160 unintentionally memorized any of the canary text samples 134. In particular, FIG. 3A illustrates a schematic view of a first training process 300, 300a configured to train the first external LM (e.g., first LM) 160 using a first corpus of training text samples 130. Here, the first corpus of training text samples 130 includes a set of training text utterances 132, 132a—n and a set of canary text samples 134, 134a—n. The set of training text utterances 132 may include generic text samples that are not user-specific or do not contain sensitive information about users. For example, the training text utterances 132 may include "hey Google," "what appointments do I have this week?" and "what is the weather today?" The first training process 300a also obtains the set of canary text samples 134 where each canary text sample 134 includes a fixed-length sequence (or dynamic-length sequence) of output labels. Each output label may include alphanumeric characters, graphemes, phonemes, N-grams, wordpieces, and/or words. In some instances, each output label is separated by a space. Moreover, each canary text sample 134 may represent user-specific information or sensitive information associated with a user. For example, the canary text sample 134 may correspond to a password of "o e g db u" or a credit card number of "1111 2222 3333 4444." However, in some examples, to avoid revealing any actual sensitive information associated with users, the canary text samples 134 may include a sequence of random alphanumeric characters (e.g., fictitious sensitive information) having a format that resembles sensitive information such as passwords, serial numbers, credit card numbers, and/or other secret information without actually including any sensitive information associated with users.

The first training process 300a inserts each canary text sample 134 into the first corpus of training text samples 130. As such, each training text sample 130 in the first corpus of training text samples 130 may correspond to a respective one of the training text utterances 132 or a respective one of the canary text samples 134. Moreover, the first corpus of training text samples 130 may include any number of training text samples 130. In some implementations, the first training process 300a may insert a each canary text sample 134 of a first portion of canary text samples 134 in the set of canary text samples 134 a single time (e.g., once) into the first corpus of training text samples 130 and insert each canary text sample 134 of a second portion of canary text samples 134 in the set of canary text samples 134 two or more times into the first corpus of training text samples 130. Here, the second portion of canary text samples 134 includes different canary text samples 134 than the first portion of canary text samples 134. Thus, each canary text sample 134 inserted into the first corpus of training text samples 130 may have a different number of occurrences in the first corpus of training text samples 130.

The first LM 160 may be configured to receive, as input, each training text sample 130 (e.g., training text utterance 132 or canary text sample 134) in the first corpus of training text samples 130 and generate, as output, a training transcription 162 for the corresponding training text sample 130 in the first corpus of training text samples 130. In some examples, the first LM 160 receives a subset of output labels for each training text sample 130 and generates the training transcription 162 to predict a remaining subset of output labels for the text sample. For instance, for a training text sample 130 of "1 2 3 4," the first LM 160 may receive output labels "1 2 3" and predict the next output label to be "4." In other examples, the first LM 160 receives a masked sequence of output labels for each training text sample 130 whereby one or more of the output labels are assigned a masking value (e.g., null value) (∅) and generates the training transcription 162 to predict output labels for the masked output labels. For instance, for a training text sample 130 of "p as s w or d," the first LM 160 may receive output labels "p ∅ s s w or d" and predict the masked output value ∅ to be "a."

A first training loss module 310 receives the training transcription 162 generated by the first LM 160 for each training text sample 130 and determines a first training loss 312 by comparing the training transcription 162 (e.g., predicted transcription) with the corresponding training text sample 130 (e.g., ground-truth label). Thereafter, the first training process 300a provides the first training loss 312, as feedback, to the first LM 160 and updates parameters of the first LM 160 based on the first training loss 312. As such, the first training process 300a trains the first LM 160 to generate accurate transcriptions using the set of training text utterances 132 and the set of canary text samples 134. Notably, during the first training process 300a, the first LM 160 may unintentionally memorize one or more canary text samples 134. As will become apparent, any of the canary text samples 134 memorized by the first LM 160 may be detected by the processes 201, 202 (FIG. 2).

Referring now to FIG. 3B, a second training process 300b is configured to train the second external LM (e.g., second LM) 170 using a second corpus of training text samples 131. Here the second corpus of training text samples 131 includes the set of training text utterances 132 and a set of extraneous text samples 136, 136a—n. That is, in contrast to the first training process 300a (FIG. 3A), the second training process 300b obtains and inserts the set of extraneous text samples 136 into the second corpus of training text samples 131 in lieu of the canary text samples 134. Here, each extraneous text sample 136 may include a same fixed-length sequence (or dynamic-length sequence) of output labels as the canary text samples 134. That is, each output label of the extraneous text samples 136 may include alphanumeric characters, phonemes, graphemes, N-grams, wordpieces, and/or words that are optionally separated by a space. Moreover, each extraneous text sample 136 may represent user-specific information or sensitive information about users. However, as will become apparent, each extraneous text sample 136 in the set of extraneous text samples 136 is different than each canary text sample 134 in the set of canary text samples 134. Thus, the extraneous text sample 136 may also correspond to the password of "o e g d b u" or the credit card number of "1111 2222 3333 4444," but only if these text samples are not already included in the set of canary text samples 134.

Similarly, the second training process 300b inserts each extraneous text sample 136 into the second corpus of training text samples 131. As such, each training text sample 131 in the second corpus of training text samples 131 may correspond to a respective one of the training text utterances 132 or a respective one of the extraneous text samples 136. The second LM 170 may be configured to receive, as input, each training text sample 131 (e.g., training text utterance 132 or extraneous text sample 136) in the second corpus of training text samples 131 and generate, as output, a training transcription 172 for the corresponding training text sample 131 in the second corpus of training text samples 131. In some examples, the second LM 170 is configured to receive a subset of output labels for each training text sample 131 and generates the training transcription 172 to predict a remaining subset of output labels for the text sample. In other examples, the second LM 170 receives a masked sequence of output labels for each training text sample 130 whereby one or more of the output labels are assigned a masking value (∅) and generates the training transcription 162 to predict output labels for the masked values.

A second training loss module 320 receives the training transcription 172 generated by the second language model 170 for each training text sample 131 and determines a second training loss 322 by comparing the training transcription 172 (e.g., predicted transcription) with the corresponding training text sample 131 (e.g., ground-truth label). Thereafter, the second training process 300b provides the second training loss 322, as feedback, to the second LM 170 and updates parameters of the second LM 170 based on the second training loss 322. As such, the second training process 300b trains the second LM 170 to generate accurate transcriptions using the set of training text utterances 132 and the set of extraneous text samples 136. Notably, the second LM 170 is not trained using any of the canary text samples 134. As such, the second LM 170 may represent a baseline LM for detecting whether the first LM 160 unintentionally memorized any of the canary text samples 134 during training because the second LM 170 did not use any of the canary text samples 134 during training, and thus, could not possibly memorize any of the canary text samples 134. Accordingly, the second LM 170 is used only to detect memorization of canary text samples and is not used during inference.

Referring back to FIGS. 2A and 2B, to detect whether the first LM 160 has memorized any of the canary text samples 134 the processes 201, 202 need to receive canary text samples 134 as input. However, the ASR model 200 is configured to receive audio data (e.g., acoustic frames 110) as input rather than textual input. To that end, the TTS system 140 is configured to generate, at each output step, a corresponding synthetic speech utterance 142 for each respective canary text sample 134 in the set of canary text samples 134. Each synthetic speech utterance 142 corresponds to a respective sequence of acoustic frames 110 suitable for processing by the cascading encoder 204 of the ASR model 200.

The cascading encoder 204 refers to a model structure whereby the encoding pathway includes two encoders 210, 220 that cascade such that the output of a first encoder 210 feeds the input of a second encoder 220 prior to decoding. Here, the first encoder 210 and the second encoder 220 may be cascaded irrespective of the underlying architecture of each encoder. The encoders 210, 220 may each include a stack of multi-headed (e.g., 8 heads) attention layers (e.g., 17 layers). In some examples, the stack of multi-headed attention layers of the encoders 210, 220 includes a stack of 512-dimension Conformer layers. In other examples, transformer layers may be used in lieu of Conformer layers.

The first encoder 210 may be a causal encoder that includes an initial stack of Conformer layers (e.g., 15 Conformer layers) each with a multi-headed (e.g., 8 heads) attention mechanism used as a self-attention layer. Here, each Conformer layer of the first encoder 210 may use causal convolution and left-context attention layers to restrict the first encoder 210 from using any future inputs (e.g., right-context equal to zero). On the other hand, the second encoder 220 may be a non-causal encoder that includes a final stack of Conformer layers (e.g., 2 Conformer layers) overlain on the initial stack of Conformer layers. Here, each Conformer layer of the second encoder 220 may use non-causal convolution and right-context attention layers thereby allowing the second encoder 220 to use (e.g., attend to) future inputs. That is, the second encoder 220 may receive and process additional right-context (e.g., 2.88 seconds of future acoustic frames) to generate an encoder output. As such, the first and second encoders 210, 220 may be interchangeably referred to herein as a "causal encoder 210" and a "non-causal encoder 220," respectively.

With continued reference to FIGS. 2A and 2B, the first encoder 210 receives a sequence of d-dimensional feature vectors (e.g., sequence of acoustic frames 110) $x = (x_1, x_2, \ldots, x_T)$, where $x_t \in \mathbb{R}^d$, and generates, at each output step, a first higher order feature representation 212 for a corresponding acoustic frame 110 in the sequence of acoustic frames 110. Similarly, the second encoder 220 is connected in cascade to the first encoder 210, and receives the first higher order feature representation 212, as input, and generates, at each output step, a second higher order feature representation 222 for a corresponding first higher order feature representation 212. Notably, the second encoder 220 attends to additional right-context to generate each second higher order feature representation 222. However, in some instances, the second encoder 220 generates the second higher order feature representations 222 without receiving any of the acoustic frames 110 as input. In these instances, the second encoder 220 generates the second higher order feature representations 222 using only the first higher order feature representation 212 as input. The cascading encoder 204 may operate in a streaming fashion such that, at each output step, the cascading encoder 204 generates the first and second higher order feature representations 212, 222 that correspond to either a portion of an utterance or an entire utterance.

The decoder 206 may include a recurrent neural network-transducer (RNN-T) architecture having a joint network 230 and a prediction network 240. The prediction network 240 may include a V2 embedding lookup table. The prediction network 240 is configured to receive, as input, a sequence of N previous non-blank symbols output by a final Softmax layer and generate a respective embedding for each non-blank symbol of the sequence of N previous non-blank symbols. That is, although not illustrated, the ASR model 200 may include the Softmax layer that receives the output of the decoder 206. In some implementations, the Softmax layer is separate from the decoder 206 and processes the output, $y_r$, from the decoder 206. The output of the Softmax layer is then used in a beam search process to select orthographic elements. In some examples, the Softmax layer is integrated with the decoder 206, such that the output $y_r$ of the decoder 206 represents the output of the Softmax layer. The prediction network 240 is further configured to generate an average embedding 242 by averaging the respective embeddings generated for each of the non-blank symbols.

In the non-streaming mode, the decoder 206 uses the joint network 230 to combine the first higher order feature representation 212 and the second higher order feature representation 222 output by the cascading encoder 204, as well as the average embedding 242 generated by the prediction network 240 to generate an initial transcription (e.g., decoder output) 232. The decoder output 232 can be a probability distribution, $P(y_1 | y_{i-1}, \ldots y_0, x)$, over the current sub-word unit, $y_i$, given the sequence of N previous non-blank symbols $\{y_{i-1}, \ldots, y_{i-N}\}$, and input, x. In the non-streaming mode, the decoder output 232 is output to the first LM 160 that rescores/improves the initial decoder outputs 232 from the decoder 206 with techniques such as lattice rescoring or n-best re-ranking. In other words, the decoder 206 produces the initial transcriptions 232 and the first LM 160 rescores the initial transcriptions 232 to generate transcriptions (e.g., rescored initial transcriptions) 120.

The decoder 206 is configured to generate, at each output step, the initial transcription 232 that includes a probability distribution over possible speech recognition hypotheses. Stated differently, the joint layer 230 generates, at each output step (e.g., time step), the probability distribution over possible speech recognition hypotheses. As such, the initial transcriptions 232 may be interchangeably referred to as probability distribution 232 over possible speech recognition hypotheses herein. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint network can include a posterior probability value for each of the different output labels. Thus, if there are 100 different output labels representing graphemes or other symbols, the output of the joint network can include 100 different probability values, one for each output label. The probability distribution can then be used to select and assign scores to candidate orthographic elements (e.g., graphemes, wordpieces, and/or words) in a beam search process (e.g., by the Softmax layer) for determining the initial transcription 232.

With continued reference to FIGS. 2A and 2B, in some configurations, the ASR model 200 operates in both the streaming and non-streaming modes in parallel. When operating in both the streaming and non-streaming mode at the same time, the ASR model 200 first performs streaming speech recognition on the audio data 110 using the first encoder 210 to generate the first higher order feature representation 210 for both the second encoder 220 and the decoder 206. The decoder 206 then produces a first probability distribution 232 over possible speech recognition hypotheses which is then rescored by the first LM 160 to produce the initial speech recognition results 120a. Optionally, in the streaming mode, the decoder 206 may output the first probability distribution 232 over possible speech recognition hypotheses directly thereby bypassing the first LM 160. The ASR model 200 also performs non-streaming speech recognition on the audio data 110 where the second encoder 220 uses the first higher order feature representation 212 received from the first encoder 210 to generate the second higher order feature representation 222. The decoder 206 then produces a second probability distribution 232 over possible speech recognition hypotheses which is then rescored by the first LM 160 to produce the final speech recognition result 120b.

In other configurations, the ASR model 200 operates only in the streaming mode. This may occur, for instance, when the user 104 is using applications such as voice-search or on-device dictation, which require as little latency as possible. Here, the ASR model 200 performs streaming speech recognition on the audio data 110 using only the first encoder 210 to generate the first higher order feature representation 212 for the decoder 206. The decoder 206 then produces the first probability distribution 232 over possible speech recognition hypotheses which is then rescored by the first LM 160 to produce the initial speech recognition results 120a. Because the streaming mode of the ASR model 200 produces the initial speech recognition results 120a quickly, any inaccuracies of terms is generally acceptable to users.

In yet other configurations, the ASR model 200 operates in only the non-streaming mode. The non-streaming mode may occur, for instance, when the user 104 is viewing a transcription of a voicemail left on his/her phone. As discussed above, this type of application benefits from using future context to improve performance in exchange for increased processing times. Here, the ASR model 200 first uses the first encoder 210 to generate the first higher order feature representation 212 for the second encoder 220, but the decoder 206 does not decode the first higher order feature representation 212. The ASR model 200 then performs non-streaming speech recognition on the encoded audio data 110 where the second encoder 220 uses the first higher order feature representation 212 received from the first encoder 210 to generate the second higher order feature representation 222. The decoder 206 then produces the second probability distribution 232 over possible speech recognition hypotheses which is then rescored by the first LM 160 to produce the final speech recognition result 120b. Because the non-streaming mode of the ASR model 200 produces the final speech recognition results 120b accurately, the latency to display the accurate transcription is generally acceptable to users.

In some examples, the first LM 160 includes an external neural language model. Here, the external neural language model may include a stack of multi-headed (e.g., 8-heads) self-attention layers (e.g., 12 layers) where each layer includes a model dimension of 768 and a feedforward layer dimension of 2048. The stack of multi-headed self-attention layers may include a stack of transformer layers or a stack of Conformer layers. For example, the stack of Conformer layers may include unidirectional Conformer layers that look back a predetermined number of tokens (e.g., 31 tokens) for each output wordpiece model prediction. Here, first LM 160 is trained to predict 4,096 wordpieces. In some instances, the second LM 170 (FIG. 2A) includes a same structure as the first LM 160.

Integrating ASR models 200 with external LMs typically requires shallow fusion. However, overconfidence of the cascading encoder 204 and the decoder 206 can make weighting difficult and often lead to high deletion of words. Here, the trained first LM 160 configured to rescore probability distributions 232 over possible speech recognition hypotheses predicted by the trained ASR model 200 may be integrated with the trained ASR model 200 using shallow fusion. Accordingly, the first encoder 210 and the second encoder 220 of the ASR model 200 may be trained using a Hybrid Autoregressive Transducer (HAT) Factorization to facilitate the integration of the first LM 160 trained on text-only data including the first corpus of training text samples 130 and the set of canary text samples 134 inserted into the first corpus of training text samples 130 (FIG. 3A). Stated differently, the HAT Factorization may be utilized to factor out an internal loss score of the cascading encoder 204 and the decoder 206 during training of the ASR model 200 to facilitate integration with the first LM 160 by optimizing the decoder 206 according to:

$$y^* = \underset{y}{argmax}[\log p(y \mid x) - \lambda_2 \log pILM(y) + \lambda_2 \log pLM(y)] \quad (1)$$

In Equation 1, p(y|x) represents a log-posterior score of the ASR model 200, pILM(y) represents an internal language model score of the ASR model 200, pLM represents a language model score of the first LM 160, and $(\lambda_1, \lambda_2)$ represent interpolation weights.

Referring now specifically to FIG. 2A, in some implementations, the first process 201 executes a detection loss module 150 and the second LM 170 for detecting whether the first LM 160 memorized any canary text samples 134 during training (FIG. 3A) on a per-set of canary text samples 134 basis. That is, the first training process 201 determines whether the first LM 160 memorized one or more canary text samples 134 without specifically identifying which particular canary text samples 134 were memorized. Here, the first process 201 executes the first and second LMs 160, 170 after training occurs. Notably, the second LM 170 is used only as a baseline LM for detecting unintended memorization by the first LM 160 whereby the second LM 170 is not used during inference by the ASR system 118 (FIG. 1). Simply put, the second LM 170 represents a baseline LM because the second LM 170 was trained on the second corpus of training text samples 131 (FIG. 3B) including training samples similar to the canary text samples without actually including any one of the canary text samples 134.

For each respective canary text sample 134, the first LM 160 rescores the initial transcription 232 generated by the decoder 206 for the corresponding synthetic speech utterance 142 to generate the transcription 120. Similarly, for each respective canary text sample 134, the second LM 170 rescores the initial transcription generated by the decoder 206 for the corresponding synthetic speech utterance 142 to generate a detection transcription 174. Thus, for each respective canary text sample 134, the first process 201 generates a corresponding transcription 120 and a corresponding detection transcription 174 both associated with the same respective canary text sample 134.

In some examples, the detection loss module 150 is configured to receive, for each respective canary text sample 134, the transcription 120 generated by the first LM and the detection transcription 174 generated by the second LM 170 determine WERs for each respective LM 160, 170. That is, detection loss module 150 determines a first WER 152 of the first LM 160 based on comparing the transcription 120 with the corresponding canary text sample 134 (e.g., ground-truth label). Similarly, the detection loss module 150 determines a second WER 154 of the second LM 170 based on comparing the detection transcription 174 with the corresponding canary text sample 134 (e.g., ground-truth label). Thus, the first and second WERs 152, 154 represent an aggregate WER for the entire set of canary text samples 134. The first and second WERs 152, 154 may include a cosine similarity between corresponding canary text sample 134 and the transcription 120 or detection transcription 174, respectively.

Thus, the detection loss module 150 may detect that the first LM 160 memorized canary text samples 134 by comparing the first WER 152 of the first LM 160 and the second WER 154 of the second LM 170. In particular, the detection loss module 150 may determine a WER difference between the first WER 152 and the second WER 154 and determine whether the WER difference satisfies a difference threshold. In response to determining that the difference satisfies the difference threshold, the detection loss module 150 detects that the first LM 160 memorized one or more of the canary text samples 134 on a per-set of canary text sample 134 basis without specifically identifying which particular canary text samples 134 were memorized. Simply put, if the first LM 160 produces transcriptions 120 for the set of canary text samples that, on average for the entire set of canary text samples 134, are much more accurate than the detection transcription 174 generated by the second LM 170, the detection loss module 150 determines that one or more of the canary text samples 134 were memorized by the first LM 160 during training (FIG. 3A). Advantageously, by simply comparing WERs of the first and second LMs 160, 170 the first process 201 does not need access to an N-best list or confidence level values generated the first LM 160 that are generally not available to users without direct access to the first LM 160. In some examples, the detection loss module 150 detects that the first LM 160 memorized canary text samples 134 by determining whether the first WER 152 satisfies a WER threshold without ever considering the second WER 154. Here, a lower first WER 152 of the first LM 160 corresponds to an increased memorization of the canary text samples 134 by the first LM 160.

Referring now specifically to FIG. 2B, in some implementations, the second process 202 executes a classifier 180 for detecting whether the first LM 160 memorized canary text samples 134 during training (FIG. 3A) on per-sample basis. Notably, in contrast to the first process 201 (FIG. 2A), the second process 202 identifies particular canary text samples 134 memorized by the first LM 160. Moreover, the second process 202 detects memorization by the first LM 160 without leveraging any other LMs.

In some scenarios, the synthetic speech utterances 142 generated by the TTS system 140 are too clear such that the decoder 206 accurately transcribes the speech without leveraging the first LM 160. In other scenarios, the synthetic speech utterances 142 generated by the TTS system 140 are too unclear such that the decoder 206 does not generate any transcriptions for the speech, and thus, the first LM 160 cannot rescore the transcription. To that end, the TTS system 140 augments the synthetic speech utterance 142 generated for each canary text sample 134. In particular, the TTS system generates an augmented synthetic speech utterance 142, 142A by adding noise to a suffix portion 144 of the corresponding synthetic speech utterance 142 without adding any noise to a prefix portion 146 of the corresponding synthetic speech utterance 142. By augmenting only the suffix portion 144 the TTS system 140 ensures the second process 202 leverages the first LM 160 to rescore the initial transcriptions 232 without making the augmented synthetic speech utterance 142A too unclear such that the decoder 206 does not generate any transcriptions for the augmented synthetic speech utterance 142A.

For each respective canary text sample 134, the first LM 160 rescores the initial transcription 232 generated by the decoder 206 for the corresponding augmented synthetic speech utterance 142A to generate the transcription 120. The classifier 180 is configured to receive, for each respective canary text sample 134, the transcription 120 generated by the first LM 160 for the corresponding augmented synthetic speech utterance 142A and a corresponding canary text sample 134. Here, the classifier 180 determines that the corresponding canary text sample 134 was used to train the first LM 160 based on the transcription 120 generated for the corresponding augmented synthetic speech utterance 142A matching the corresponding canary text sample 134. Stated differently, the classifier 180 determines whether the canary text sample 134 used to train the first LM 160 was unintentionally memorized by the first LM 160 during training. Here, the classifier 180 may determine, for each respective canary text sample 134, whether the first LM 160 memorized the respective canary text sample 134 by determining that the transcription 120 generated by the first LM 160 satisfies a threshold difference between the transcription 120 and the respective canary text sample 134. In some configurations, the transcription 120 must exactly match respective canary text sample 134 to be classified as being memorized by the first LM 160. As such, the classifier 180 outputs a corresponding indicator 182 for each respective canary text sample 134 denoting whether the respective canary text sample 134 was memorized, or not memorized, by the first LM 160.

However, the processes 201, 202 merely detect whether the first LM 160 memorized any canary text samples 134 without reducing the memorization. To that end, referring back to FIG. 3A, the first example training process 300a may further include mitigating the detected memorization of the canary text samples 134 by the first LM 160 by applying per-sample gradient clipping while training the first LM 160. In some instances, the first example training process 300a clips a gradient of each training text sample 130 to a fixed maximum clip norm and then adds random noise to the mean clipped gradient. In these instances, the gradient clipping ensures strong privacy of the first LM 160 at a significant expense of reduced generalization during inference. As such, the first example training process 300*a* applies per-sample gradient clipping for each canary text sample 134 clipping a gradient from a prescribed number of the canary text samples 134 thereby bounding a sensitivity of the clipped gradient of the canary text samples. Advantageously, applying per-sample gradient clipping in this manner ensures less memorization by the first LM 160 without sacrificing generalization of the first LM 160 during inference. Optionally, the per-sample gradient clipping may be applied for each training text sample 130.

Figure 4:
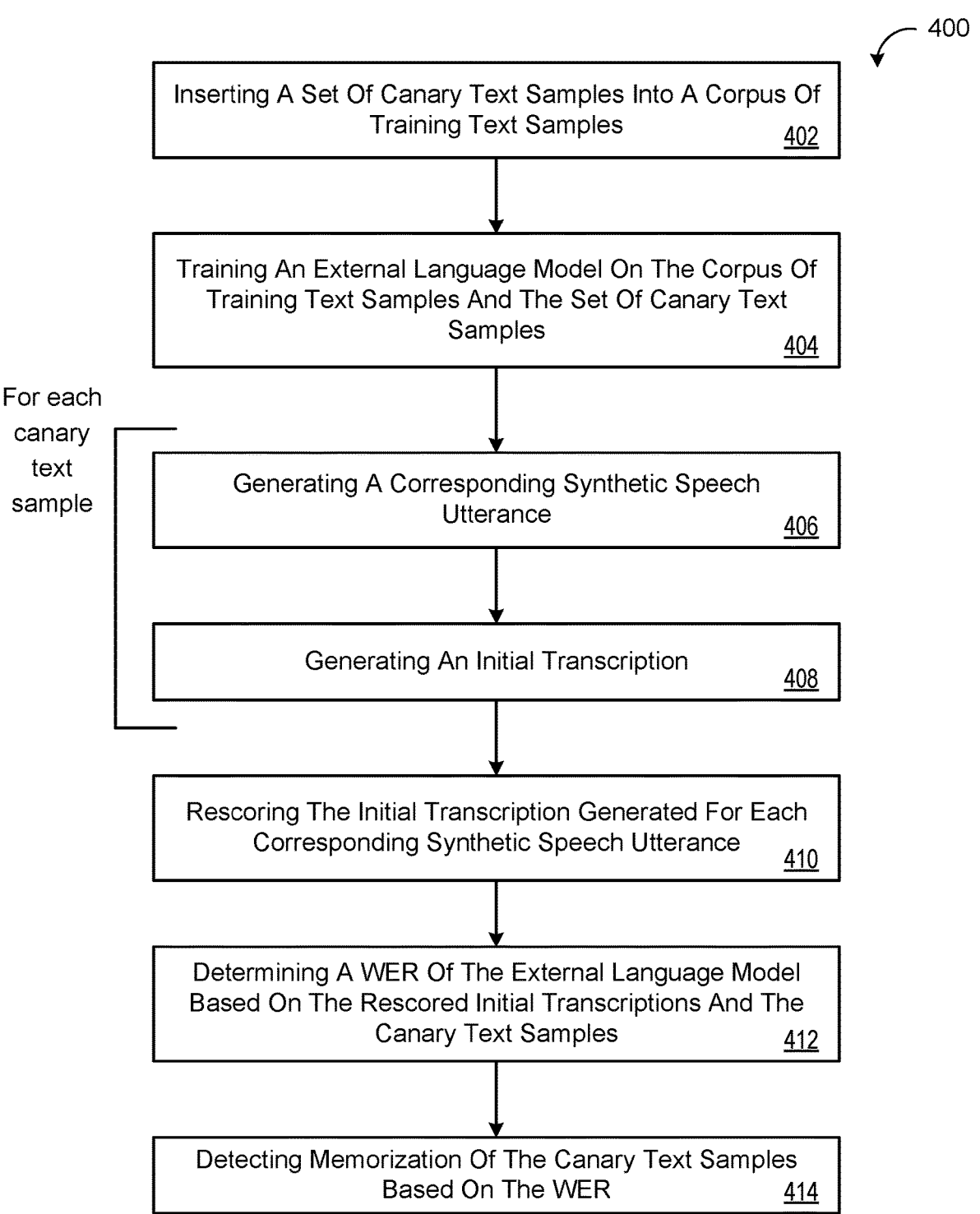
FIG. 4 is a flowchart of an example arrangement of operations for a method of detecting unintended memorization in language-model-fused automatic speech recognition systems.

FIG. 4 is a flowchart of an exemplary arrangement of operations for a computer-implemented method 400 for detecting that a language model unintentionally memorized canary text samples. At operation 402, the method 400 includes inserting a set of canary text samples 134 into a first corpus of training text samples 130. At operation 404, the method 400 includes training a first LM 160 on the first corpus of training text samples 130 and the set of canary text samples 134 inserted into the first corpus of training text samples 130. For each respective canary text sample 134 in the set of canary text samples 134, the method 400 performs operations 406 and 408. At operation 406, the method 400 includes generating a corresponding synthetic speech utterance 142 for the respective canary text sample 134 using a TTS system 140. At operation 408, the method 400 includes generating an initial transcription 232 for the corresponding synthetic speech utterance 142 using a trained ASR model 200 configured to receive, as input, the corresponding synthetic speech utterance 142.

At operation 410, the method 400 includes rescoring the initial transcription 232 generated for each corresponding synthetic speech utterance using the first LM 160. Here, the rescored initial transcriptions output by the first LM 160 may correspond to a transcription 120. For instance, when the trained ASR model 200 operates in the streaming mode, the first LM 160 outputs the rescored initial transcriptions corresponding to an initial speech recognition result 120, 120*a*. On the other hand, when the trained ASR model 200 operates in the non-streaming mode, the first LM 160 outputs the rescored initial transcriptions corresponding to final speech recognition results 120, 120*b*. At operation 412, the method 400 includes determining a first WER 152 of the first LM 160 based on the rescored initial transcriptions (e.g., transcriptions) 120 and the canary text samples (e.g., ground-truth labels) 134. At operation 414, the method 400 includes detecting memorization of the canary text samples 134 by the first LM 160 based on the first WER 152 of the first LM 160. In some examples, the method 400 detects memorization of the canary text samples 134 by comparing the first WER 152 of the first LM 160 to a second WER 154 of a second LM 170. In other examples, the method 400 detects memorization of the canary text samples by using a classifier 180.

Figure 5:
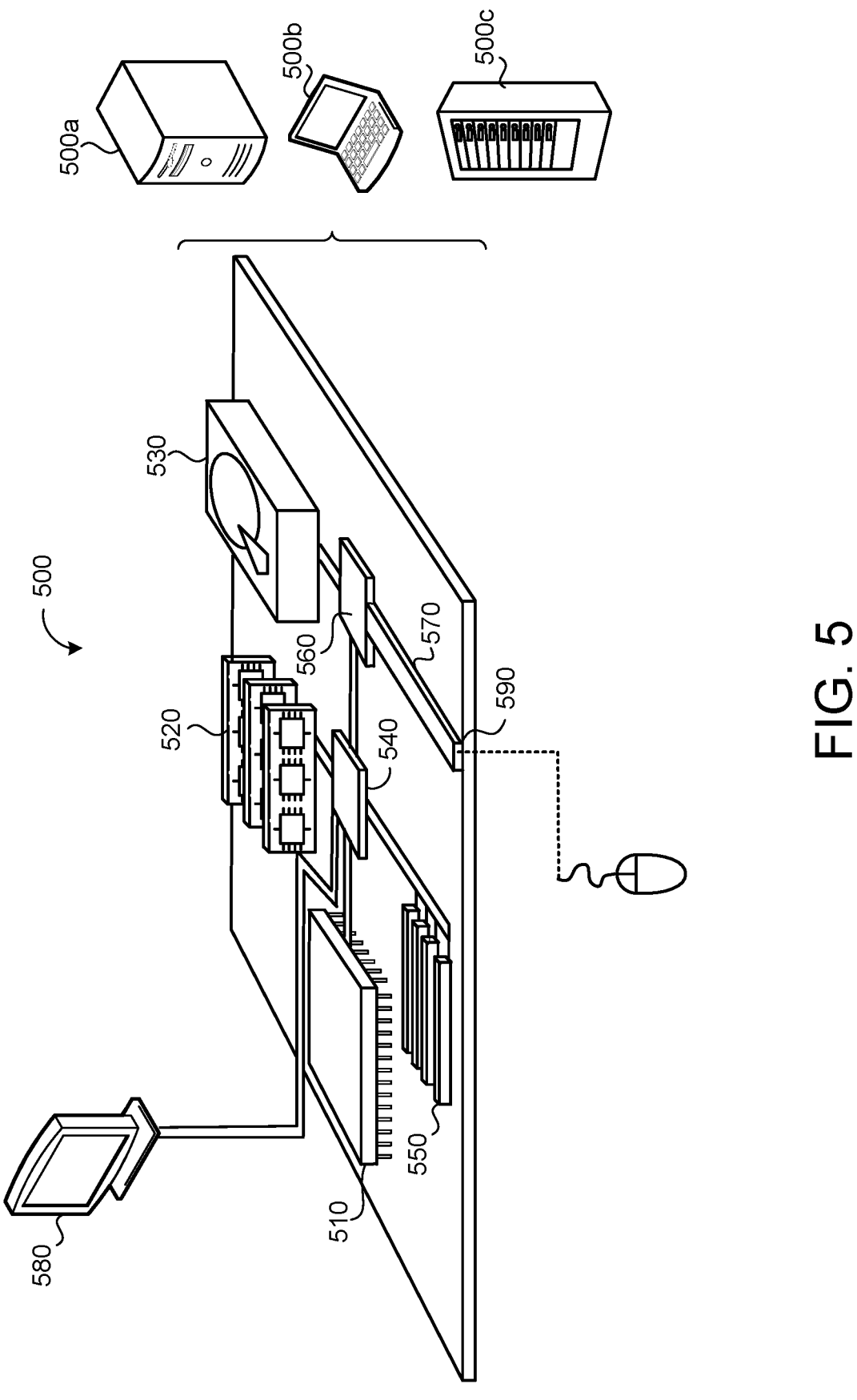
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

inserting a set of canary text samples into a corpus of training text samples;

training an external language model on the corpus of training text samples and the set of canary text samples inserted into the corpus of training text samples;

for each canary text sample in the set of canary text samples:

generating, using a text-to-speech (TTS) system, a corresponding synthetic speech utterance; and generating, using a trained automatic speech recognition (ASR) model configured to receive the corresponding synthetic speech utterance as input, an initial transcription for the corresponding synthetic speech utterance;

rescoring, using the external language model trained on the corpus of training text samples and the set of canary text samples inserted into the corpus of training text samples, the initial transcription generated for each corresponding synthetic speech utterance;

determining a word error rate (WER) of the external language model based on the rescored initial transcriptions and the canary text samples; and detecting memorization of the canary text samples by the external language model based on the WER of the external language model, wherein the trained ASR model comprises:

a first encoder configured to generate, at each of a plurality of output steps, a first higher order feature representation for a corresponding acoustic frame in a sequence of acoustic frames;

a second encoder configured to generate, at each of the plurality of output steps, a second higher order feature representation for a corresponding first higher order feature representation generated by the first encoder; and a decoder configured to, at each of the plurality of output steps, one of:

when the ASR model is operating in a non-streaming mode, generate a first probability distribution over possible speech recognition hypotheses based on the second higher order feature representation generated by the second encoder at a corresponding output step; or when the ASR model is operating in a streaming mode, generate a second probability distribution over possible speech recognition hypotheses based on the first higher order feature representation generated by the first encoder at a corresponding output step, and wherein the decoder comprises:

a prediction network configured to, at each of the plurality of output steps:

receive, as input, a sequence of N previous non-blank symbols output by a final Softmax layer;

for each non-blank symbol of the sequence of N previous non-blank symbols, generate a respective embedding; and generate an average embedding by averaging the respective embeddings; and a joint network configured to:

receive, as input, the average embedding generated by the prediction network at each of the plurality of output steps and one of:

when the ASR model is operating in the streaming mode, the first higher order feature representation generated by the first encoder at each of the plurality of output steps; or when the ASR model is operating in the non-streaming mode, the second higher order feature representation generated by the second encoder at each of the plurality of output steps; and generate, at each of the plurality of output steps, one of:

when the ASR model is operating in the streaming mode, the second probability distribution over possible speech recognition hypotheses; or when the ASR model is operating in the non-streaming mode, the first probability distribution over possible speech recognition hypotheses.

2. The computer-implemented method of claim 1, wherein a lower WER of the external language model corresponds to an increased memorization of the canary text samples by the external language model.

3. The computer-implemented method of claim 1, wherein the operations further comprise:

inserting a set of extraneous text samples into a second corpus of training text samples;

training a second external language model on the second corpus of training text samples and the set of extraneous text samples inserted into the second corpus of training text samples;

for each canary text sample in the set of canary text samples, receiving the initial transcription generated by the trained ASR model for the corresponding synthetic speech utterance;

rescoring, using the second external language model trained on the second corpus of training text samples and the set of extraneous text samples inserted into the second corpus of training text samples, the initial transcription generated for each corresponding synthetic speech utterance;

determining a second WER of the second external language model based on the initial transcriptions rescored by the second external language model and the canary text samples; and detecting memorization of the canary text samples by the external language model by comparing the WER of the external language model and the second WER of the second external language model.

4. The computer-implemented method of claim 1, wherein the operations further comprise, when training the external language model, mitigating the detected memorization of the canary text samples by the external language model by applying per-sample gradient clipping by clipping a gradient from a prescribed number of the canary text samples.

5. The computer-implemented method of claim 1, wherein the operations further comprise, for each canary text sample in the set of canary text samples:

adding noise to a suffix portion of the corresponding synthetic speech utterance without adding any noise to a prefix portion of the corresponding synthetic speech utterance; and determining, using a classifier, that the corresponding canary text sample was used to train the external language model based on the rescored initial transcription generated for the corresponding synthetic speech utterance matching the corresponding canary text sample.

6. The computer-implemented method of claim 1, wherein each canary text sample in the set of canary text samples comprises a fixed-length sequence of random alphanumeric characters each separated by a space.

7. The computer-implemented method of claim 1, wherein inserting the set of canary text samples into the corpus of training text samples comprises:

inserting each canary text sample of a first portion of canary text samples in the set of canary text samples a single time into the corpus of training text samples; and inserting each canary text sample of a second portion of canary text samples in the set of canary text samples two or more times into the corpus of training text samples, the second portion of canary text samples including different canary text samples than the first portion of canary text samples.

8. The computer-implemented method of claim 1, wherein the external language model comprises an external neural language model.

9. The computer-implemented method of claim 8, wherein the external neural language model comprises a stack of transformer layers or Conformer layers.

10. The computer-implemented method of claim 1, wherein the operations further comprise integrating the trained external language model with the trained ASR model, the trained external language model configured to rescore probability distributions over possible speech recognition hypotheses predicted by the trained ASR model.

11. The computer-implemented method of claim 1, wherein:

the first encoder comprises a causal encoder comprising an initial stack of Conformer layers; and the second encoder comprises a non-causal encoder comprising a final stack of Conformer layers overlain on the initial stack of Conformer layers.

12. The computer-implemented method of claim 1, wherein the first encoder and the second encoder of the ASR model are trained using Hybrid Autoregressive Transducer Factorization to facilitate an integration of the external language model trained on text-only data comprising the corpus of training text samples and the set of canary text samples inserted into the corpus of training text samples.

13. A system comprising:

data processing hardware; and memory hardware in communication with the data processing hardware, the memory hardware storing instructions that when executed on the data processing hardware cause the data processing hardware to perform operations comprising:

inserting a set of canary text samples into a corpus of training text samples;

training an external language model on the corpus of training text samples and the set of canary text samples inserted into the corpus of training text samples;

for each canary text sample in the set of canary text samples:

generating, using a text-to-speech (TTS) system, a corresponding synthetic speech utterance; and generating, using a trained automatic speech recognition (ASR) model configured to receive the corresponding synthetic speech utterance as input, an initial transcription for the corresponding synthetic speech utterance;

rescoring, using the external language model trained on the corpus of training text samples and the set of canary text samples inserted into the corpus of training text samples, the initial transcription generated for each corresponding synthetic speech utterance;

determining a word error rate (WER) of the external language model based on the rescored initial transcriptions and the canary text samples; and detecting memorization of the canary text samples by the external language model based on the WER of the external language model, wherein the trained ASR model comprises:

a first encoder configured to generate, at each of a plurality of output steps, a first higher order feature representation for a corresponding acoustic frame in a sequence of acoustic frames;

a second encoder configured to generate, at each of the plurality of output steps, a second higher order feature representation for a corresponding first higher order feature representation generated by the first encoder; and a decoder configured to, at each of the plurality of output steps, one of:

when the ASR model is operating in a non-streaming mode, generate a first probability distribution over possible speech recognition hypotheses based on the second higher order feature representation generated by the second encoder at a corresponding output step; or when the ASR model is operating in a streaming mode, generate a second probability distribution over possible speech recognition hypotheses based on the first higher order feature representation generated by the first encoder at a corresponding output step, and wherein the decoder comprises:

a prediction network configured to, at each of the plurality of output steps:

receive, as input, a sequence of N previous non-blank symbols output by a final Softmax layer;

for each non-blank symbol of the sequence of N previous non-blank symbols, generate a respective embedding; and generate an average embedding by averaging the respective embeddings; and a joint network configured to:

receive, as input, the average embedding generated by the prediction network at each of the plurality of output steps and one of:

when the ASR model is operating in the streaming mode, the first higher order feature representation generated by the first encoder at each of the plurality of output steps; or when the ASR model is operating in the non-streaming mode, the second higher order feature representation generated by the second encoder at each of the plurality of output steps; and generate, at each of the plurality of output steps, one of:

when the ASR model is operating in the streaming mode, the second probability distribution over possible speech recognition hypotheses; or when the ASR model is operating in the non-streaming mode, the first probability distribution over possible speech recognition hypotheses.

14. The system of claim 13, wherein a lower WER of the external language model corresponds to an increased memorization of the canary text samples by the external language model.

15. The system of claim 13, wherein the operations further comprise:

inserting a set of extraneous text samples into a second corpus of training text samples;

training a second external language model on the second corpus of training text samples and the set of extraneous text samples inserted into the second corpus of training text samples;

for each canary text sample in the set of canary text samples, receiving the initial transcription generated by the trained ASR model for the corresponding synthetic speech utterance;

rescoring, using the second external language model trained on the second corpus of training text samples and the set of extraneous text samples inserted into the second corpus of training text samples, the initial transcription generated for each corresponding synthetic speech utterance;

determining a second WER of the second external language model based on the initial transcriptions rescored by the second external language model and the canary text samples; and detecting memorization of the canary text samples by the external language model by comparing the WER of the external language model and the second WER of the second external language model.

16. The system of claim 13, wherein the operations further comprise, when training the external language model, mitigating the detected memorization of the canary text samples by the external language model by applying per-sample gradient clipping by clipping a gradient from a prescribed number of the canary text samples.

17. The system of claim 13, wherein the operations further comprise, for each canary text sample in the set of canary text samples:

adding noise to a suffix portion of the corresponding synthetic speech utterance without adding any noise to a prefix portion of the corresponding synthetic speech utterance; and determining, using a classifier, that the corresponding canary text sample was used to train the external language model based on the rescored initial transcription generated for the corresponding synthetic speech utterance matching the corresponding canary text sample.

18. The system of claim 13, wherein each canary text sample in the set of canary text samples comprises a fixed-length sequence of random alphanumeric characters each separated by a space.

19. The system of claim 13, wherein inserting the set of canary text samples into the corpus of training text samples comprises:

inserting each canary text sample of a first portion of canary text samples in the set of canary text samples a single time into the corpus of training text samples; and inserting each canary text sample of a second portion of canary text samples in the set of canary text samples two or more times into the corpus of training text samples, the second portion of canary text samples including different canary text samples than the first portion of canary text samples.

20. The system of claim 13, wherein the external language model comprises an external neural language model.

21. The system of claim 20, wherein the external neural language model comprises a stack of transformer layers or Conformer layers.

22. The system of claim 13, wherein the operations further comprise integrating the trained external language model with the trained ASR model, the trained external language model configured to rescore probability distributions over possible speech recognition hypotheses predicted by the trained ASR model.

23. The system of claim 13, wherein:

the first encoder comprises a causal encoder comprising an initial stack of Conformer layers; and the second encoder comprises a non-causal encoder comprising a final stack of Conformer layers overlain on the initial stack of Conformer layers.

24. The system of claim 13, wherein the first encoder and the second encoder of the ASR model are trained using Hybrid Autoregressive Transducer Factorization to facilitate an integration of the external language model trained on text-only data comprising the corpus of training text samples and the set of canary text samples inserted into the corpus of training text samples.

\* \* \* \* \*